(12) United States Patent
Saito et al.

(10) Patent No.: US 8,777,317 B2
(45) Date of Patent: Jul. 15, 2014

(54) ADJUSTABLE ARMREST DEVICE

(75) Inventors: Makoto Saito, Ina (JP); Takashi Morimoto, Ina (JP); Yoshiharu Kitamura, Aikawa-machi (JP); Hideko Kitamura, legal representative, Aikawa-machi (JP); Ken Suzuki, Aikawa-machi (JP); Toshikazu Numazawa, Aikawa-machi (JP)

(73) Assignee: NHK Spring Co., Ltd., Kanagawa (JP)

( * ) Notice: Subject to any disclaimer, the term of this patent is extended or adjusted under 35 U.S.C. 154(b) by 1407 days.

(21) Appl. No.: 12/521,356

(22) PCT Filed: Dec. 4, 2007

(86) PCT No.: PCT/JP2007/073426
§ 371 (c)(1),
(2), (4) Date: Aug. 17, 2012

(87) PCT Pub. No.: WO2008/081677
PCT Pub. Date: Jul. 10, 2008

(65) Prior Publication Data
US 2013/0015692 A1 Jan. 17, 2013

(30) Foreign Application Priority Data
Dec. 28, 2006 (JP) ................... 2006-355244

(51) Int. Cl.
*B60N 2/46* (2006.01)
(52) U.S. Cl.
USPC .............. 297/411.32; 297/411.3; 297/411.35; 297/411.38
(58) Field of Classification Search
USPC ................. 297/411.3, 411.32, 411.35, 411.38
See application file for complete search history.

(56) References Cited

U.S. PATENT DOCUMENTS 5,395,160 A * 3/1995 Krebs et al. ............ 297/411.3 X
6,467,847 B2 * 10/2002 Bidare ..................... 297/411.32
(Continued)

FOREIGN PATENT DOCUMENTS

JP 2006-026115 2/2006
JP 2006-044518 2/2006

*Primary Examiner* — Rodney B White
(74) *Attorney, Agent, or Firm* — Greer, Burns & Crain, Ltd.

(57) ABSTRACT

An armrest device including a stationary shaft 2, fixed to a seat frame, an armrest body 7 in which the stationary shaft 2 is inserted and which is rotatable, a lock spring 3 made of a coil spring tightly wound around the stationary shaft 2, with one end of the coil spring serving as a stationary-side hook 3*a* locked to the armrest body 7, and the other end of the coil spring serving as a free-side hook 3*b* A hook-supporting part 12 that supports the free-side hook 3*b* such that the free-side hook 3*b* is raised in the axial direction of the stationary shaft 2, a hook-fitting part 13 that enlarges the diameter of the lock spring 3 by dropping the free-side hook 3*b* on the hook-supporting part 12 downward in the axial direction of the stationary shaft 2, a plate 11 for a hook, where the plate 11 projects from the armrest body 7, and a cam member 5 on the stationary shaft 2. The cam member 5 having (1) an unlocking cam part 5*b* for unlocking the lock spring 3 by dropping the free-side hook 3*b* from the hook-supporting part 12 into the hook-fitting part 13 when the armrest body 7 is rotated in the armrest-accommodating direction, and (2) a relocking cam part 5*c* for locking the lock spring 3 by raising the free-side hook 3*b* from the hook-fitting part 13 and supporting it by the hook-supporting part 12 when the armrest body 7 is rotated in the armrest-use direction.

6 Claims, 22 Drawing Sheets

(56) References Cited

U.S. PATENT DOCUMENTS

| | | |
|---|---|---|
| 6,916,068 B2 * | 7/2005 | Kitamura et al. ........... 297/411.3 |
| 7,198,331 B2 * | 4/2007 | Omori ....................... 297/411.32 |
| 7,393,058 B2 * | 7/2008 | Omori ....................... 297/411.32 |
| 7,484,810 B2 * | 2/2009 | Yamane et al. ........... 297/411.32 |
| 8,177,301 B2 * | 5/2012 | Saito et al. ................ 297/411.32 |
| 2002/0096928 A1 * | 7/2002 | Bidare ...................... 297/411.32 |
| 2006/0061189 A1 | 3/2006 | Yamane et al. |

\* cited by examiner

Fig. 9 (a)
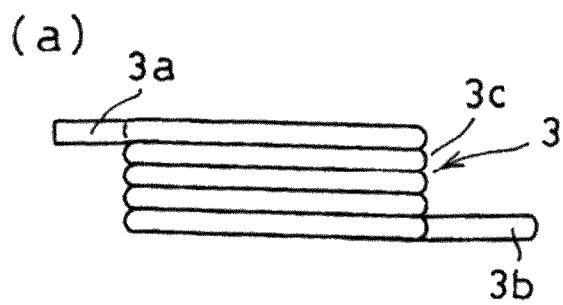
(b)
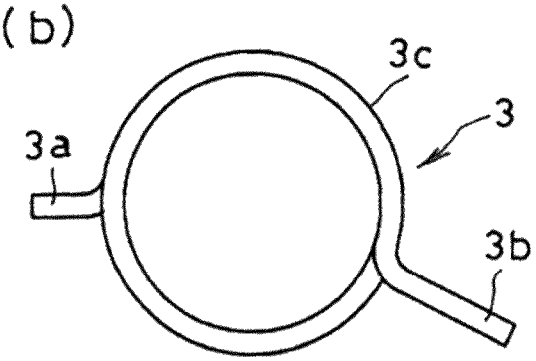
Fig. 10 (a)
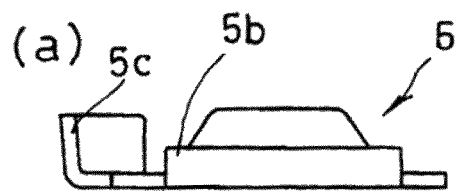
(b)
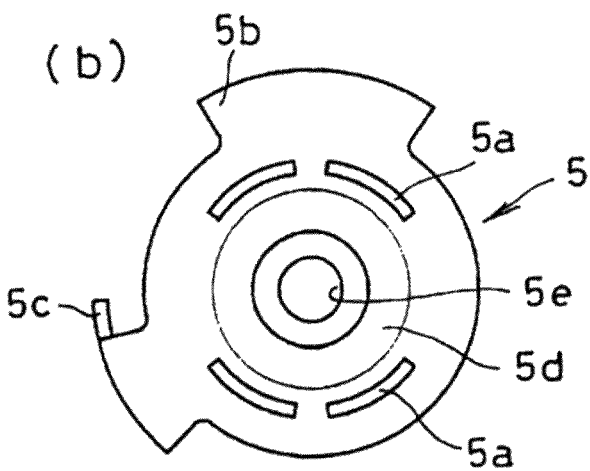

Fig. 16
(a)
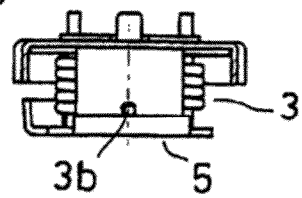
(b)
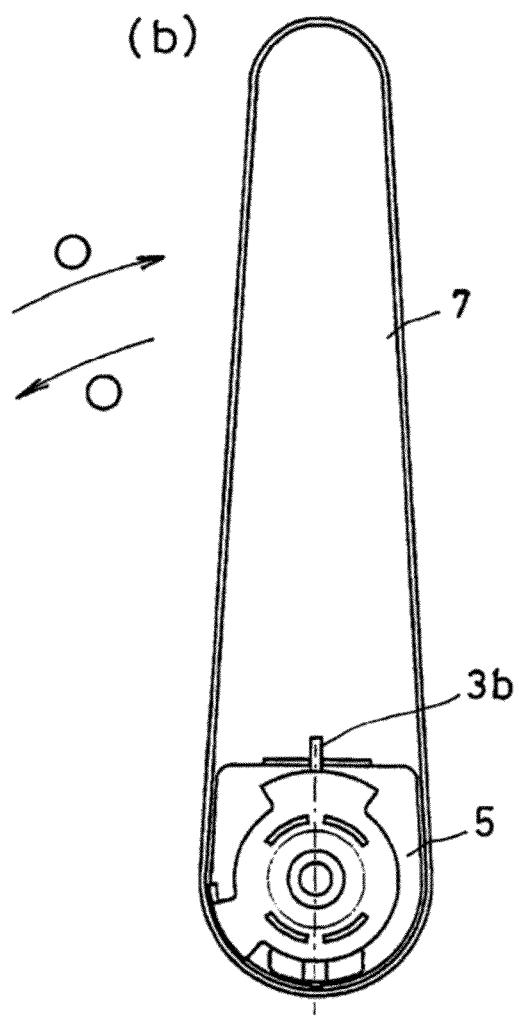

(a) (b)

Fig. 23
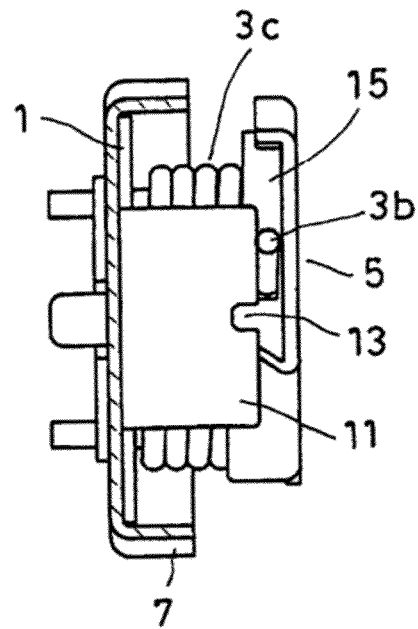
Fig. 24 (a)
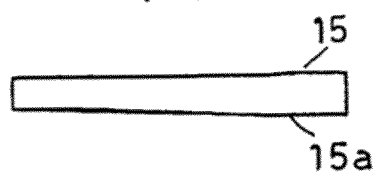
(b)     (c)     (d)
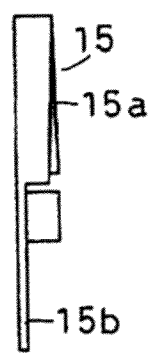 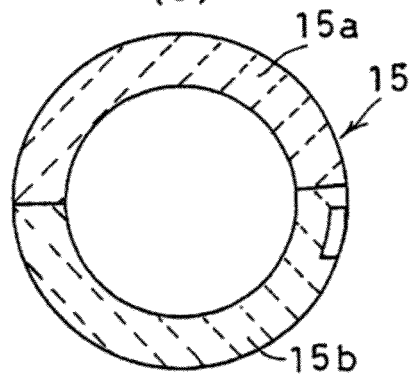 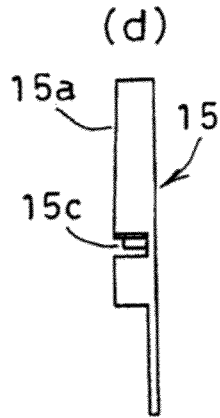
(e)
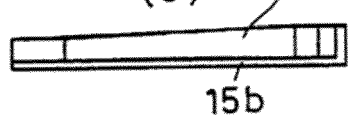

Fig. 25
(a)
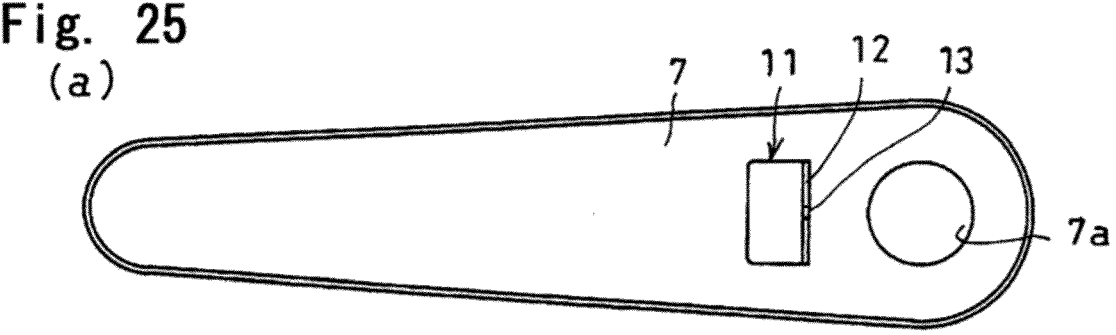
(b)
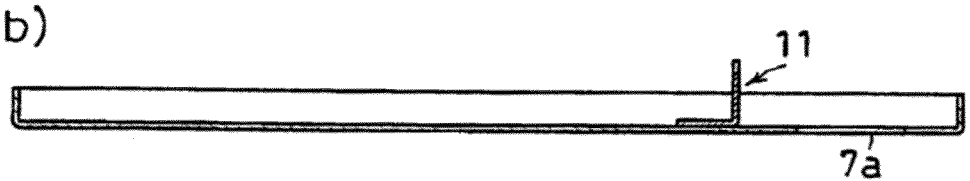
Fig. 26
(a)
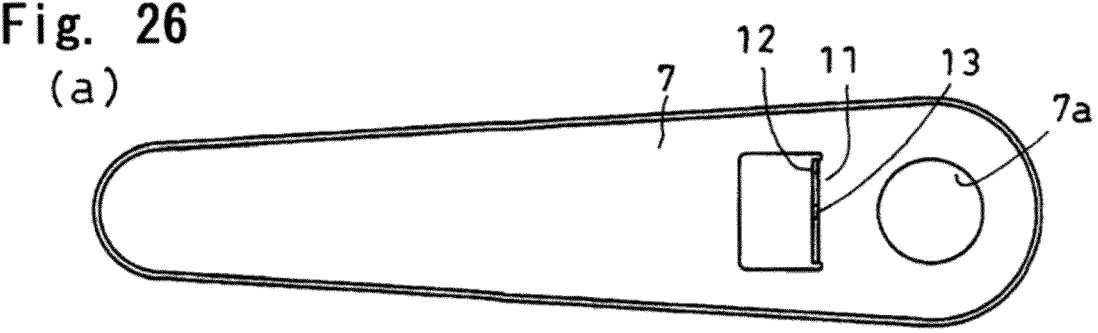
(b)
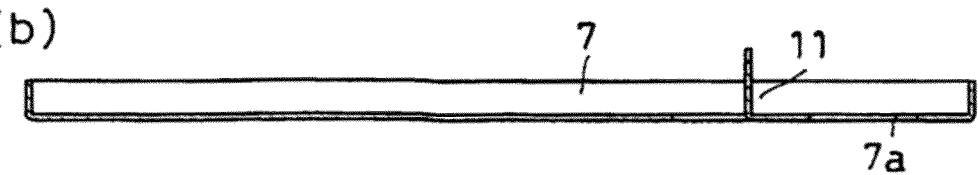

Fig. 27 (a)
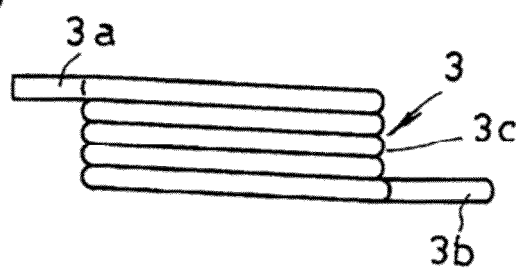
(b)
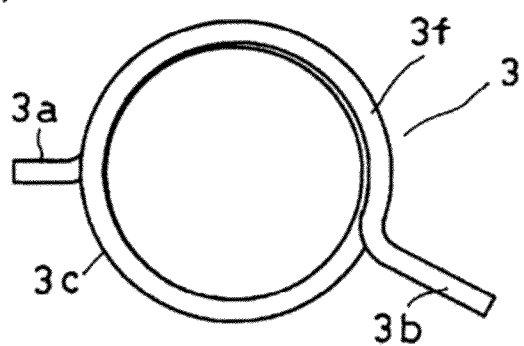

ADJUSTABLE ARMREST DEVICE

FIELD OF THE INVENTION

The present invention relates to a movable armrest device that can be mounted to a seat of an automobile, and in particular to an armrest device whose angle can be adjusted in a stepless manner.

BACKGROUND OF THE INVENTION

Japanese Published Patent Application No. 2003-299547 ("JP '547") and Japanese Published Patent Application No. 2006-26115 ("JP '115") disclose conventional movable armrest devices. In these armrest devices, the armrest body can freely rotate against a seat frame, and a coil spring is used as a lock spring for locking and unlocking the rotation of the armrest body.

In the armrest device disclosed in JP '547, a lock spring is wound around a stationary shaft that is provided to the seat frame, so that the rotation of the armrest body can be locked and unlocked. The lock spring has a stationary-side hook and a free-side hook. The stationary-side hook is fixed to the armrest body, and the free-side hook moves in the diameter-enlarging direction (the direction for enlarging the diameter of the lock spring) or the diameter-reducing direction (the direction for reducing the diameter of the lock spring). When the free-side hook moves in the diameter-enlarging direction, the lock spring unlocks, and when the free-side hook moves in the diameter-reducing direction, the lock spring locks.

In the armrest device of JP '547, the free-operation part of a ring part makes the free-side hook of the lock spring rotate in the diameter-enlarging direction of the lock spring, and then the free-side engagement part of the free-side hook drops into a slit of a cover part on the side of the armrest body, so that the lock spring unlocks. At the same time, to the extent that the free-side engagement part drops into the slit, the free-side hook moves upward. Thus, the free-side hook loses contact with the free-operation part, and moves in a movement groove, so that the ring part is allowed to rotate. Accordingly, the armrest body can be rotated in the direction that enables the armrest body to be accommodated upright in the seat.

The armrest device disclosed in JP '115 includes an unlocking contact part, an unlocking cam surface, and a switching cam groove. The unlocking contact part contacts the free-side hook of the lock spring, so as to unlock the lock spring. The unlocking cam surface and the switching cam groove become engaged with the free-side hook. In this armrest device, the unlocking contact part rotates the free-side hook of the lock spring in the direction for enlarging the diameter of the lock spring. Thereby, the free-side hook moves onto the unlocking cam surface, and then drops into the switching cam groove. Also, when the unlocking contact part rotates the free-side hook, the guiding cam surface further presses down the free-side hook, and the free-side hook loses contact with the unlocking contact part, so that the free-side hook is allowed to rotate. Therefore, the armrest body can be rotated in the accommodating direction.

SUMMARY

The armrest device disclosed in JP '547 has a structure such that the free-side hook of the lock spring is always pressed down in the axial direction of the stationary shaft, and that, due to the reaction force of this pressing down, the free-side hook drops into the slit. However, when the free-side hook is pressed down in the axial direction of the stationary shaft, the coil part of the lock spring, which is wound around the stationary shaft, makes it difficult for the free-side hook to move downward. As a result, the free-side hook is pressed down in a forced manner, and therefore the coil part of the lock spring, which is wound around the stationary shaft, becomes displaced and falls into an inappropriately wound condition. As a result, a stable locking force cannot be obtained, and the reaction force of the free-side hook—the free-side hook's reaction force that tends to return the free-side hook upward—becomes large. Therefore, the rotating cover part and the free-side hook tend to become enmeshed with each other or to become abraded, which is a problem.

In addition, because the cover part presses down the free-side hook, it is necessary to provide a movement groove—which allows the movement of the free-side hook after the free-side hook becomes detached from the free-operation part of the ring part—in the free-operation part. Thus, the free-operation part inevitably becomes elongated, resulting in the free-operation part having either insufficient strength for rotating the free-side hook or low durability, which is a problem.

In the armrest device disclosed in JP '115, when the guiding cam surface presses down the free-side hook of the lock spring in the axial direction of the stationary shaft, the coil part of the lock spring, which is wound around the stationary shaft, makes it difficult for the free-side hook to move downward. As a result, the free-side hook is pressed down in a forced manner, and therefore the coil part of the lock spring, which is wound around the stationary shaft, becomes displaced and falls into an inappropriately wound condition. As a result, a stable locking force cannot be obtained, and the reaction force of the free-side hook—the free-side hook's reaction force that tends to return the free-side hook upward—becomes large. Therefore, the free-side hook and the lower face of the unlocking contact part, which rotates, tend to become enmeshed with each other or to become abraded, which is a problem.

One objective of the present invention is to provide an armrest device that prevents both reduction of the locking force, and meshing and abrasion of parts—problems that are caused by the free-side hook of the lock spring.

In an embodiment, an armrest device is provided that comprises a stationary shaft, which is fixed to a seat frame; an armrest body into which the stationary shaft is inserted, and which is rotatably supported; a lock spring made of a coil spring that is tightly wound around the stationary shaft, with one end of the coil spring serving as a stationary-side hook that is locked to the armrest body and whose other end serves as a free-side hook; a plate for a hook which is provided so as to project from the armrest body, and has a hook-supporting part that supports the free-side hook in a condition that the free-side hook is raised in the axial direction of the stationary shaft, and a hook-fitting part that enlarges the diameter of the lock spring due to dropping down of the free-side hook, which is on the hook-supporting part, in the axial direction of the stationary shaft; cam member that is provided to the stationary shaft and that has an unlocking cam part for unlocking the lock spring by dropping down the free-side hook into the hook-fitting part from the hook-supporting part when the armrest body is rotated in an accommodating direction, and a relocking cam part for raising the free-side hook from the hook-fitting part and causing the hook-supporting part to support the free-side hook so as to lock the lock spring when the armrest body is rotated in the armrest-use direction.

When the free-side hook of the lock spring is supported by the hook-supporting part of the plate for the hook, the free-side hook is raised in the axial direction of the lock spring, and the lock spring is in a locked condition where the lock spring's diameter is reduced. As a result, the armrest body does not rotate in the lock spring's diameter-reducing direction. When the free-side hook drops into the hook-fitting part, the free-side hook moves downward in the axial direction of the stationary shaft, and the lock spring's diameter enlarges into the unlocked condition. Therefore, the armrest body can rotate in a normal or reverse direction. The unlocking cam part of the cam functions such that the free-side hook of the lock spring drops into the hook-fitting part, and the relocking cam part functions such that the free-side hook is raised so as to be supported by the hook-supporting part.

The free-side hook is raised in the axial direction of the stationary shaft, and at the same time the lock spring is in a locked condition in which the lock spring's diameter is reduced. In this manner, the direction in which the free-side hook is raised is the direction for moving away from the coil part of the lock spring. As a result, the coil part does not become a hindrance, and it is easy for the free-side hook to move. Excessive force is not applied on the coil part, and thus the coil part is not displaced, and a stable locking force can be obtained. Accordingly, the hook-supporting part and the free-side hook, which slide on each other, do not become abraded or enmeshed with each other.

In another embodiment, the armrest device further includes a spacer that has a presser-face part that faces the coil part of the lock spring and that restrains the axial displacement of the coil part, and a hook-allowance-face part that faces the free-side hook and that allows the free-side hook to be raised or dropped, and wherein said invention the spacer is mounted to the stationary shaft.

In a further embodiment, the plate for the hook of the armrest device has a hook-guiding part that contacts the free-side hook, which is supported by the hook-supporting part, so as to promote dropping of the free-side hook into the hook-fitting part.

In another embodiment, the cam member of the armrest device has an inclined guiding face that guides the free-side hook, which is supported by the hook-supporting part, to the hook-fitting part.

In a further embodiment, the cam member of the armrest has an inclined holding face that contacts the free-side hook, so as to make the free-side hook drop more deeply into the hook-fitting part when the free-side hook drops into the hook-fitting part.

In another embodiment, a portion of the coil part of the lock spring, adjacent to the free-side hook, has a larger inside diameter than the inside diameter of any other portion of the coil part.

In the present invention, the lock spring is reduced in diameter and, at the same time, the free-side hook is raised in the axial direction of the stationary shaft. The direction in which the free-side hook is raised is the direction for moving away from the coil part of the lock spring. As a result, the coil part does not become a hindrance, and it is easy for the free-side hook to move. Excessive force is not applied on the coil part, and therefore the coil part is not displaced and a stable locking force is obtained. Also, the hook-supporting part and the free-side hook do not become abraded or enmeshed with each other.

BRIEF DESCRIPTIONS OF THE DRAWINGS

FIG. 9($a$) is a side view of the lock spring, and FIG. 9($b$) is a bottom view thereof.

FIG. 10($a$) is a side view of the cam member, and FIG. 10($b$) is a plane view thereof.

Figure 12:
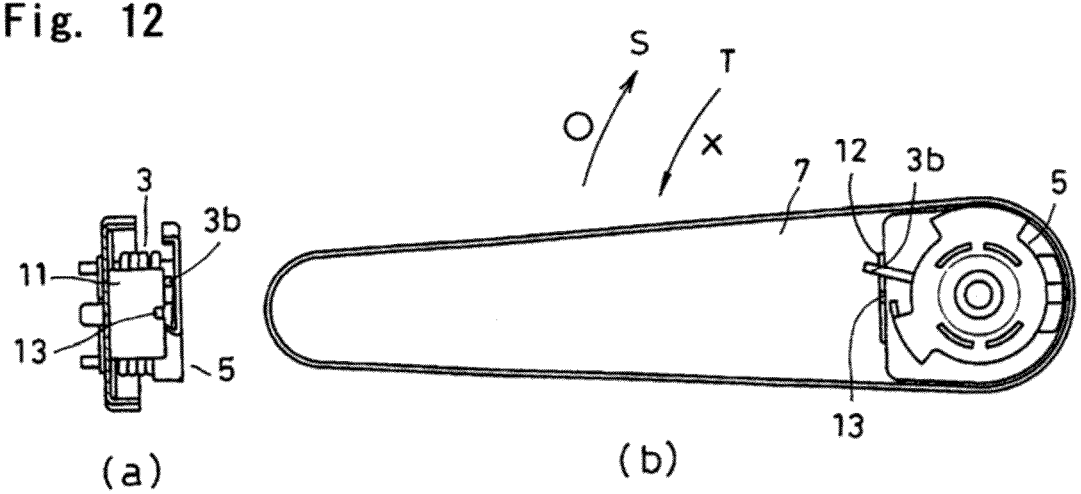

FIGS. 12($a$) and 12($b$) show how the armrest device's angle is adjusted.

Figure 13:
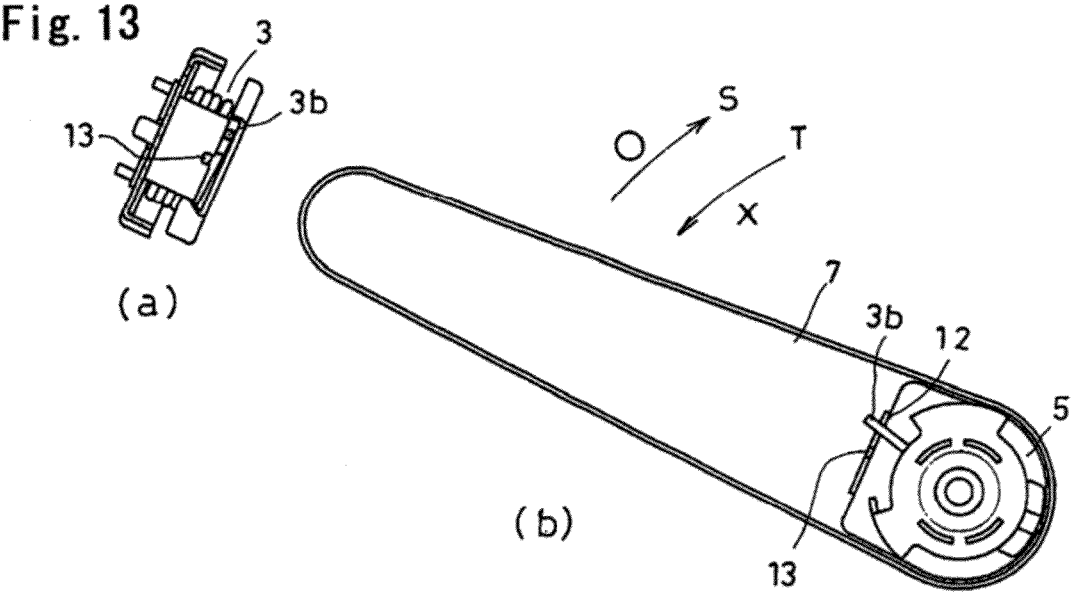
Figure 14:
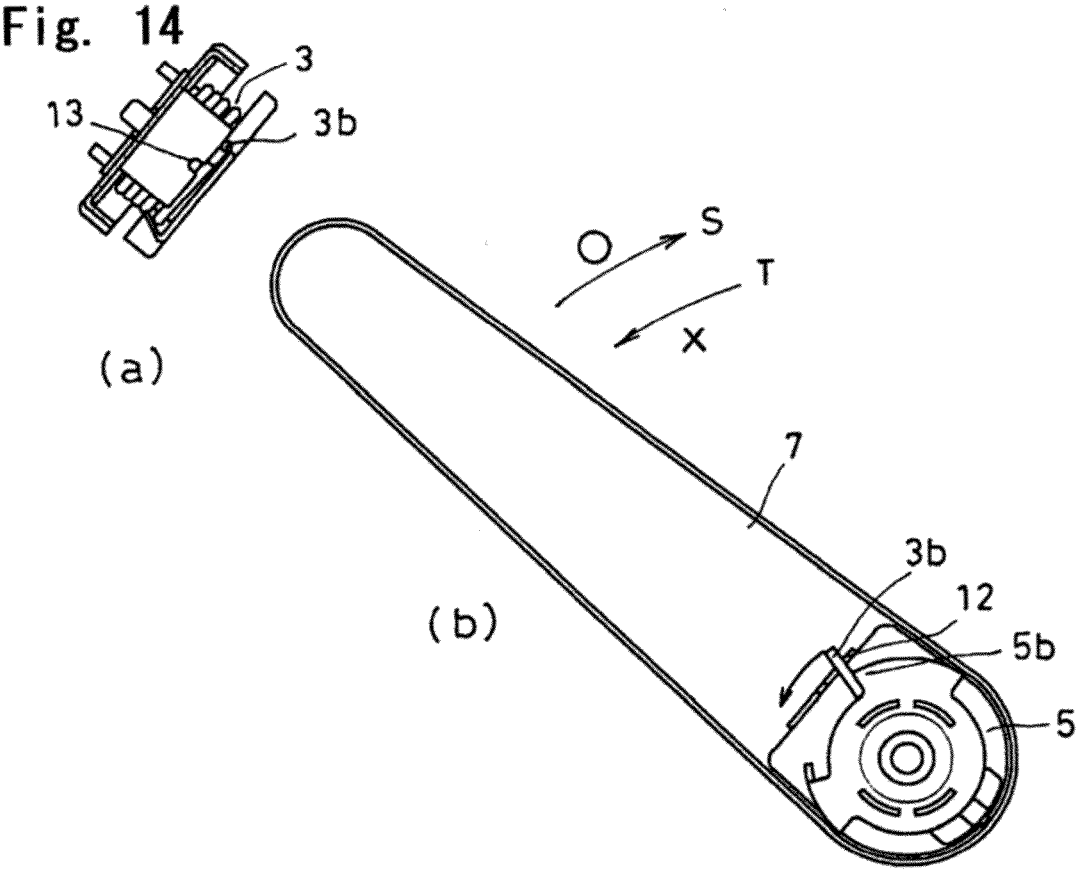
Figure 15:
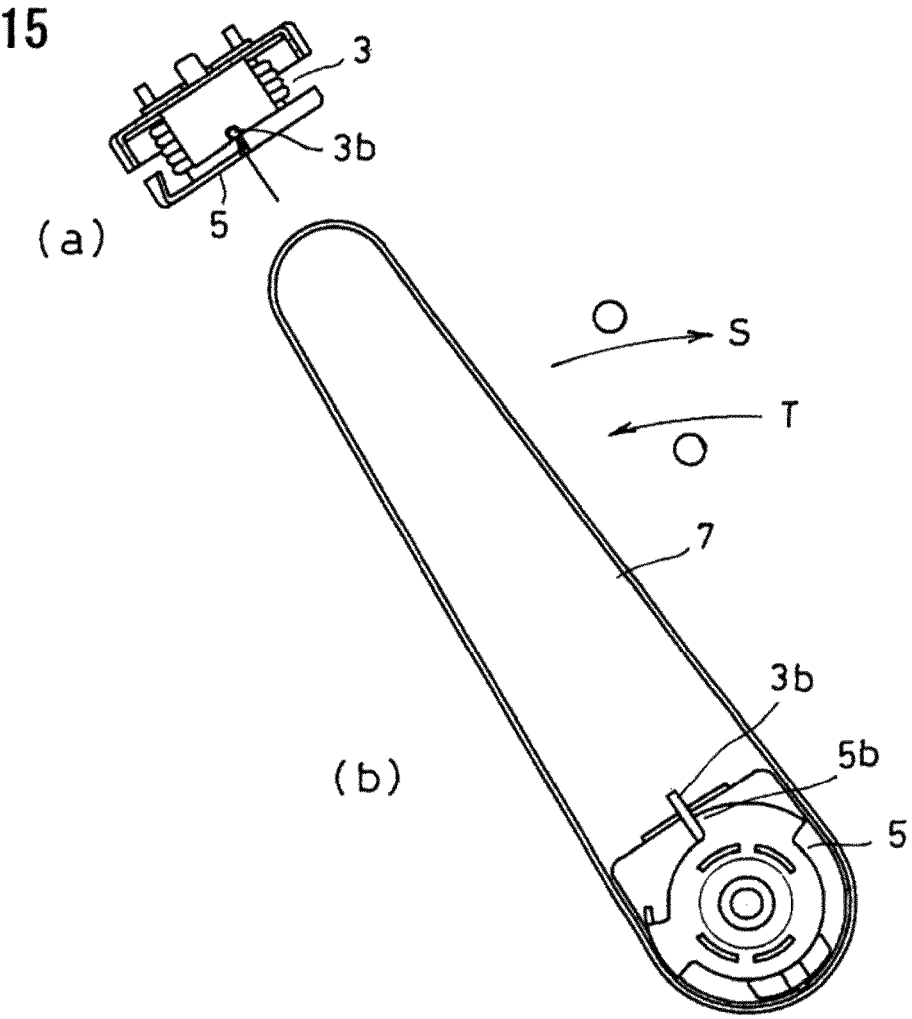
Figure 17:
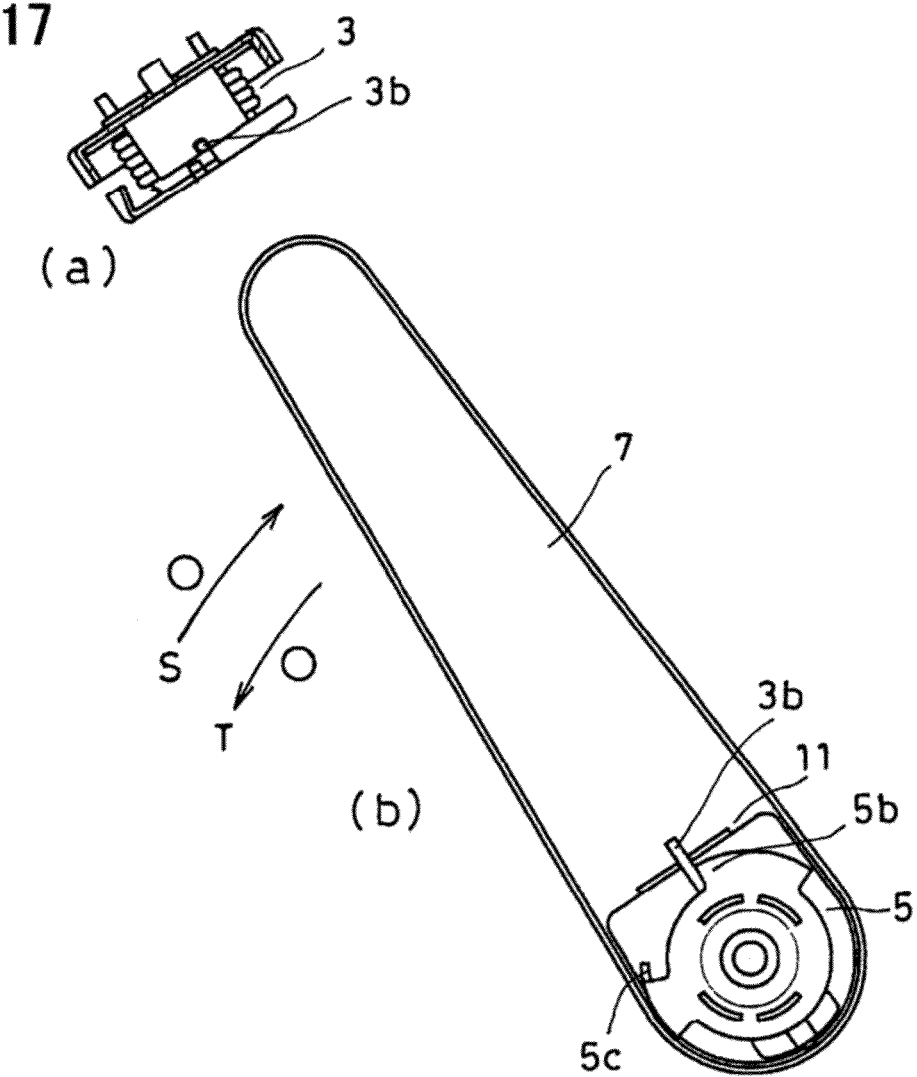
Figure 18:
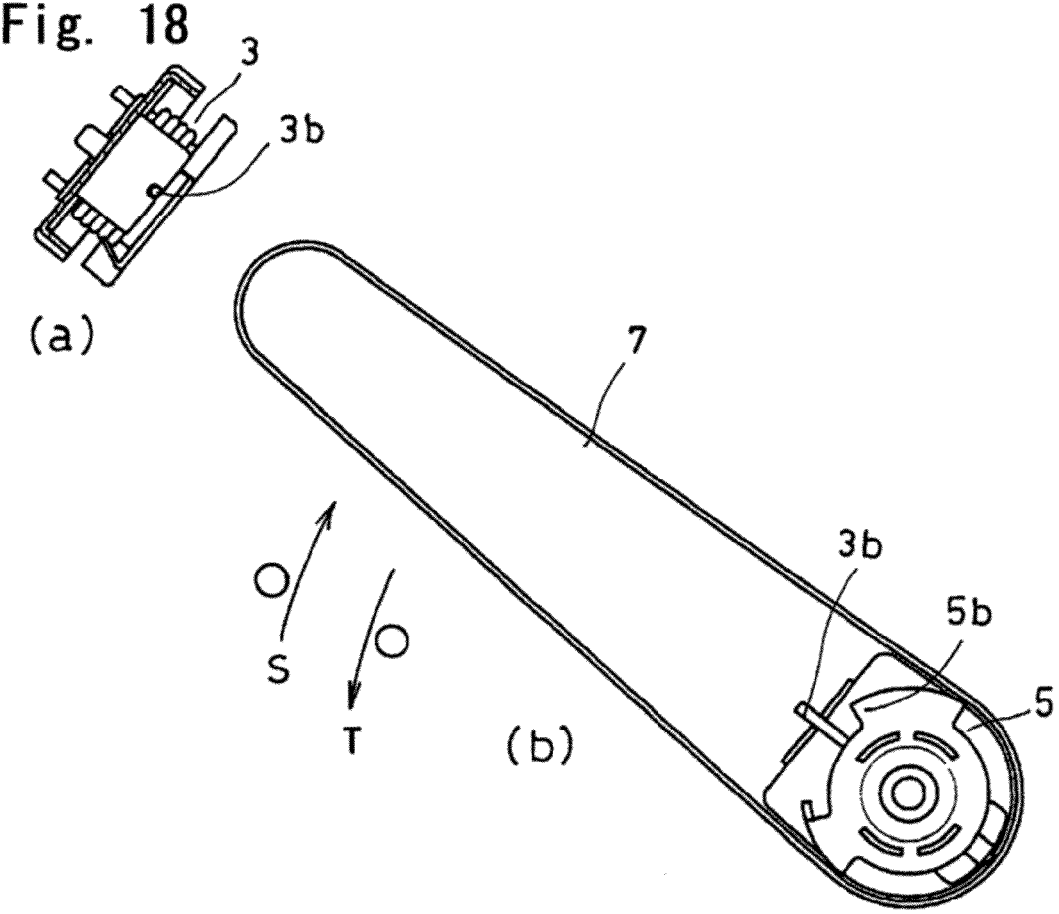
Figure 19:
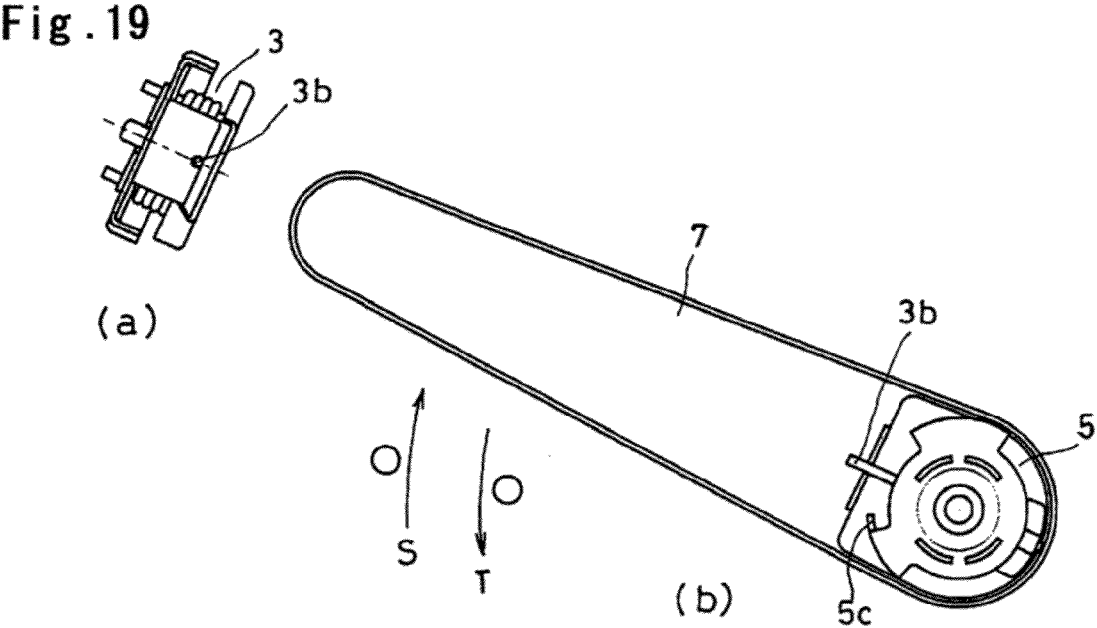
Figure 20:
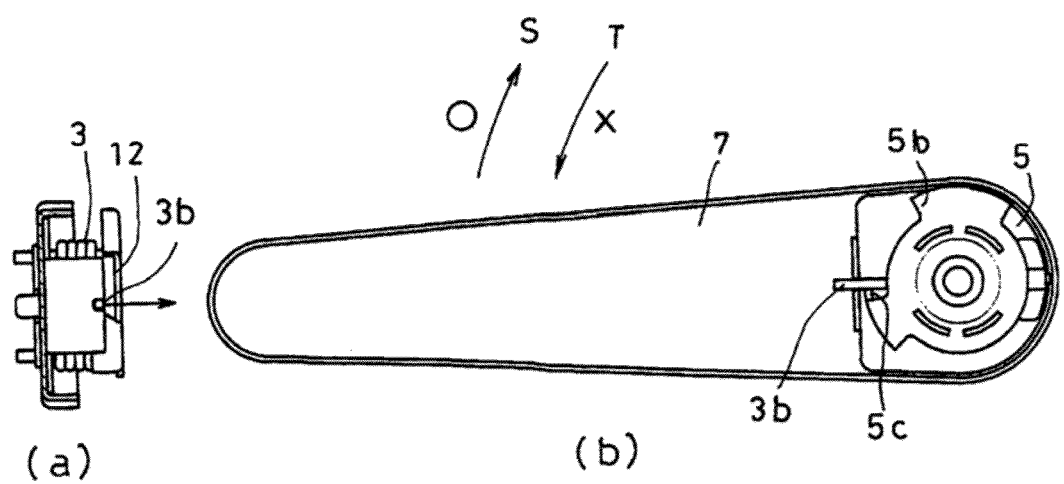

FIG. 13 shows the condition after FIG. 12.
FIG. 14 shows the condition after FIG. 13.
FIG. 15 shows the condition after FIG. 14.
FIG. 16 shows the condition after FIG. 15.
FIG. 17 shows the condition after FIG. 16.
FIG. 18 shows the condition after FIG. 17.
FIG. 19 shows the condition after FIG. 18.
FIG. 20 shows the condition after FIG. 19.

Figure 21:
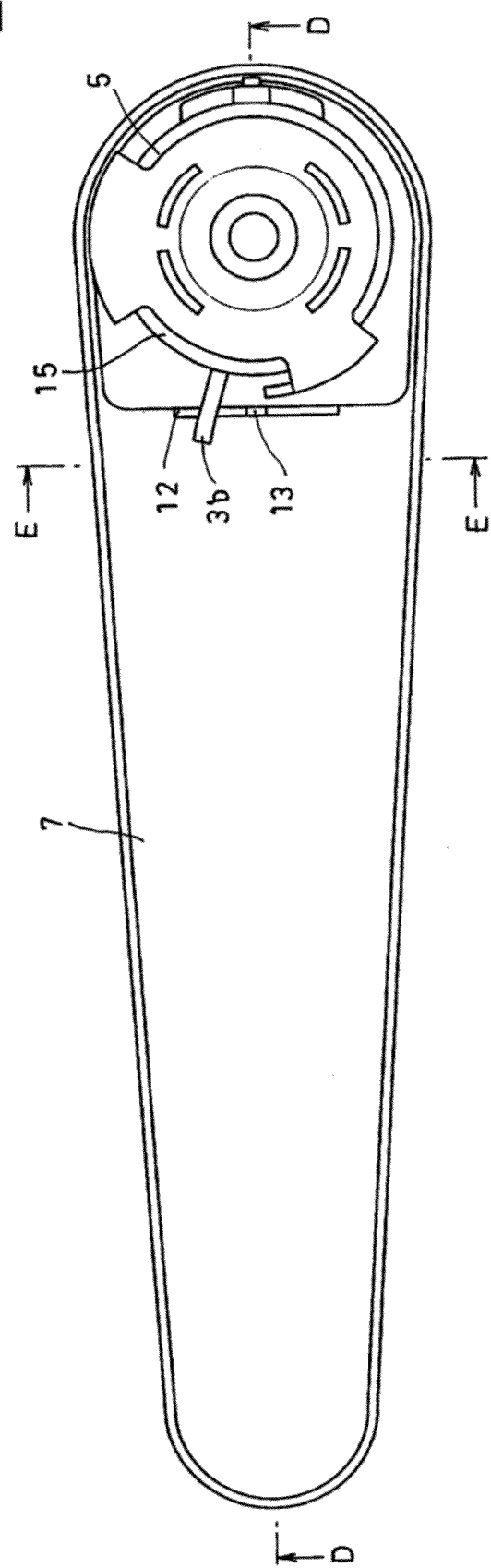

FIG. 21 is a front view of the armrest device in a second embodiment of the present invention.

Figure 22:
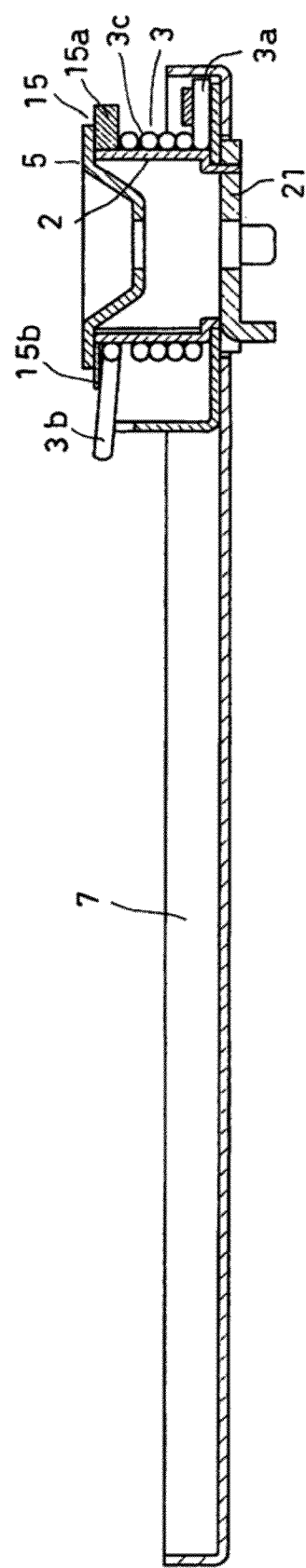

FIG. 22 is a cross-sectional view taken along the line D-D of FIG. 21.

FIG. 23 is a cross-sectional view taken along the line E-E of FIG. 21.

FIGS. 24($a$), 24($b$), 24($c$), 24($d$) and 24($e$) are plane, left-side, front, right-side, and bottom views of the spacer.

FIGS. 25($a$) and 25($b$) are plane and cross-sectional views of another embodiment of the armrest body.

FIGS. 26($a$) and 26($b$) are plane and cross-sectional views of a further embodiment of the armrest body.

FIGS. 27($a$) and 27($b$) are front and bottom views of another embodiment of the lock spring.

Figure 28:
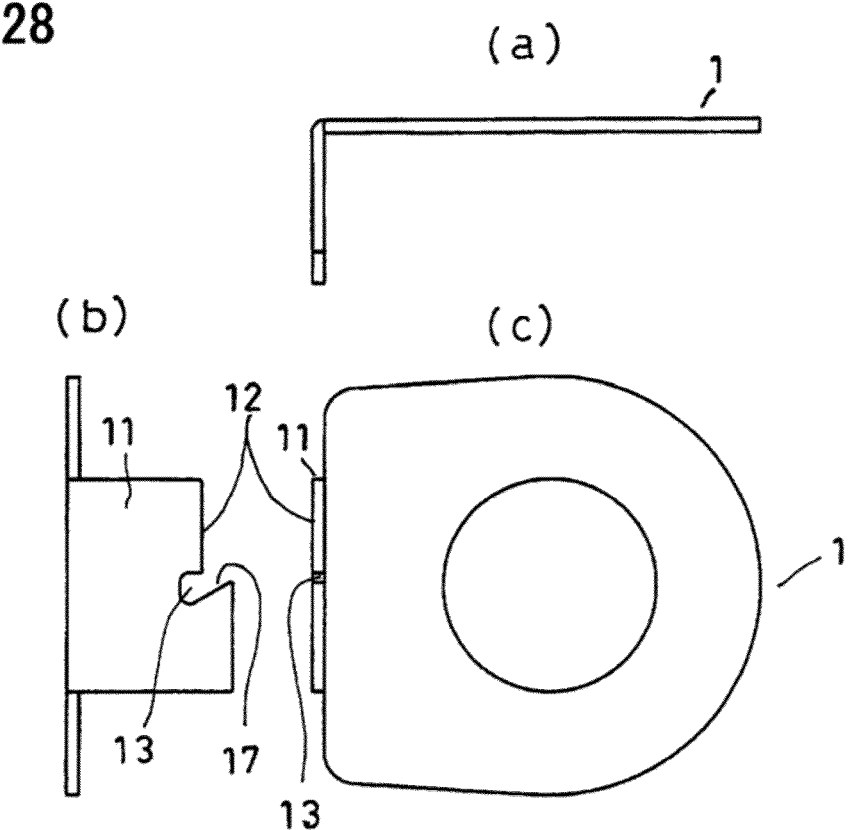

FIGS. 28($a$), 28($b$) and 28($c$) are plane, side, and front views of another embodiment of the plate for the hook.

Figure 29:
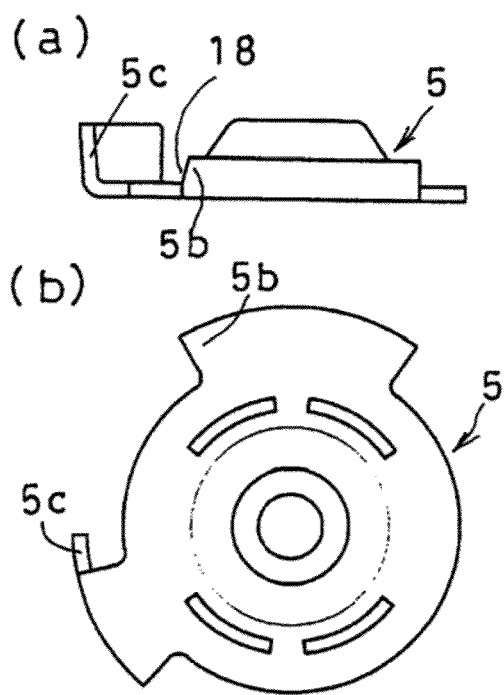

FIGS. 29($a$) and 29($b$) are front and plane views of another embodiment of the cam member.

Figure 30:
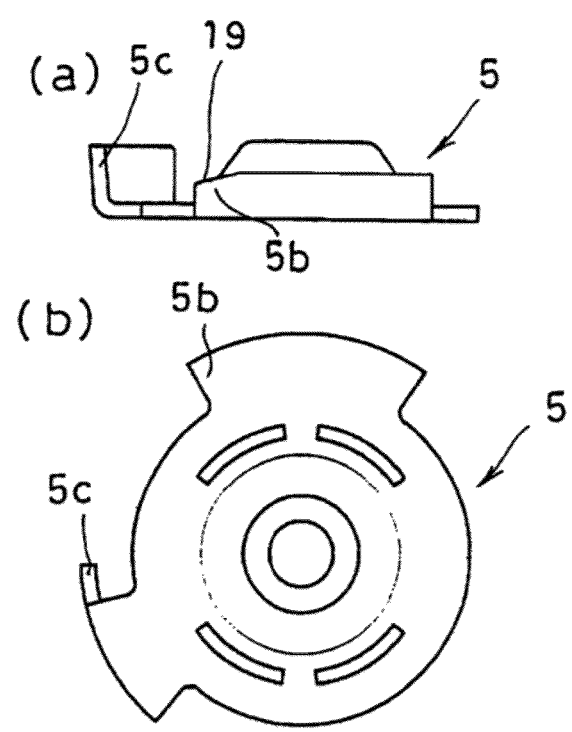

FIGS. 30($a$) and 30($b$) are front and plane views of a further embodiment of the cam member.

DETAILED DESCRIPTION

Referring to FIGS. 1-20, the armrest device includes an armrest body 7, a stationary shaft 2, a lock spring 3, a cam member 5, a rotary plate 1, and a ring element 21.

Figure 5:
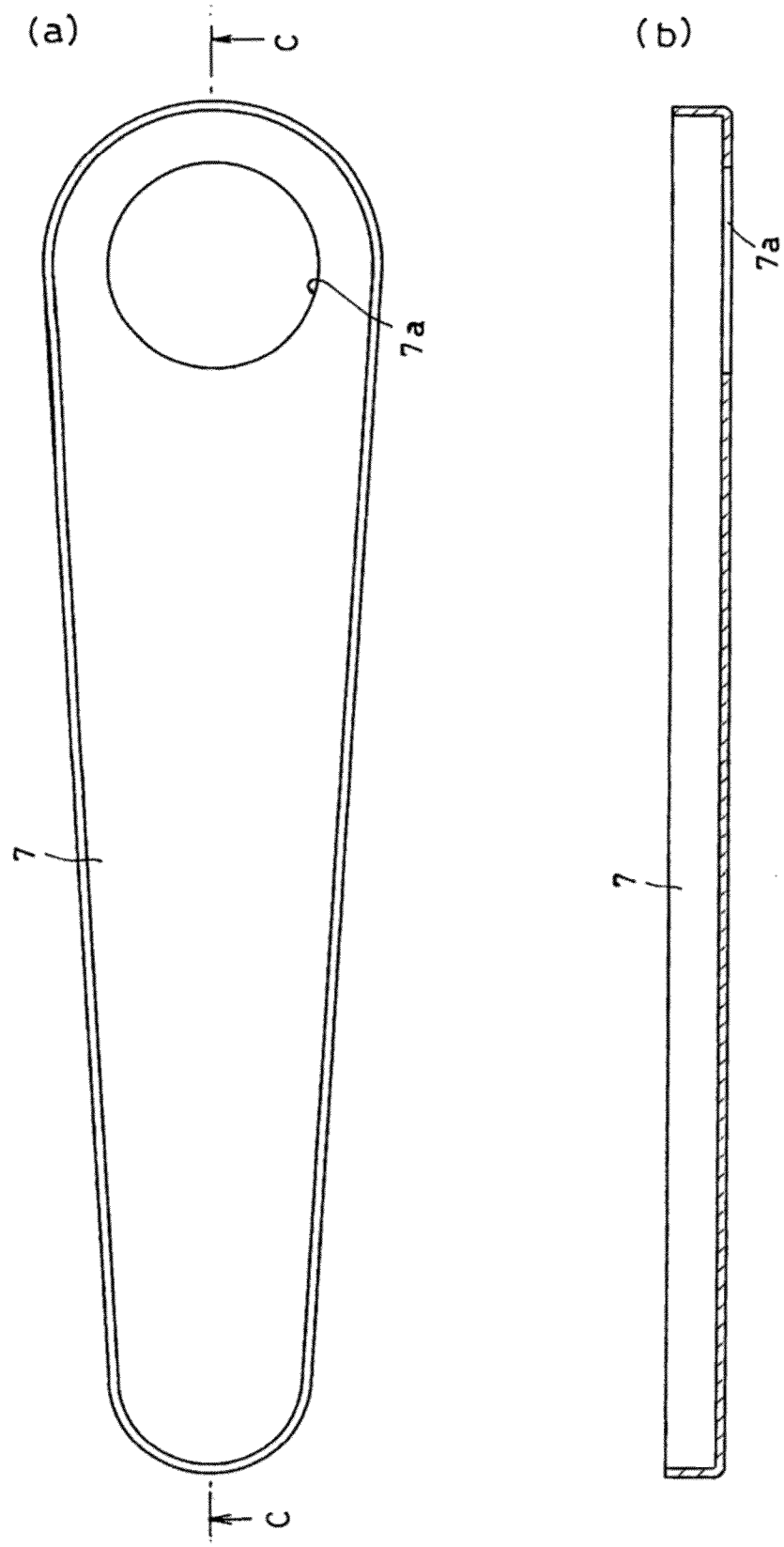
FIG. 5($a$) is a front view of the armrest body, and FIG. 5($b$) is a cross-sectional view taken along the line C-C of FIG. 5($a$).

As shown in FIG. 5, the armrest body 7 has an elongated shape. includes a through hole 7$a$, through which the stationary shaft 2 penetrates, is formed on the base end of the bottom surface of the armrest body 7.

Figure 3:
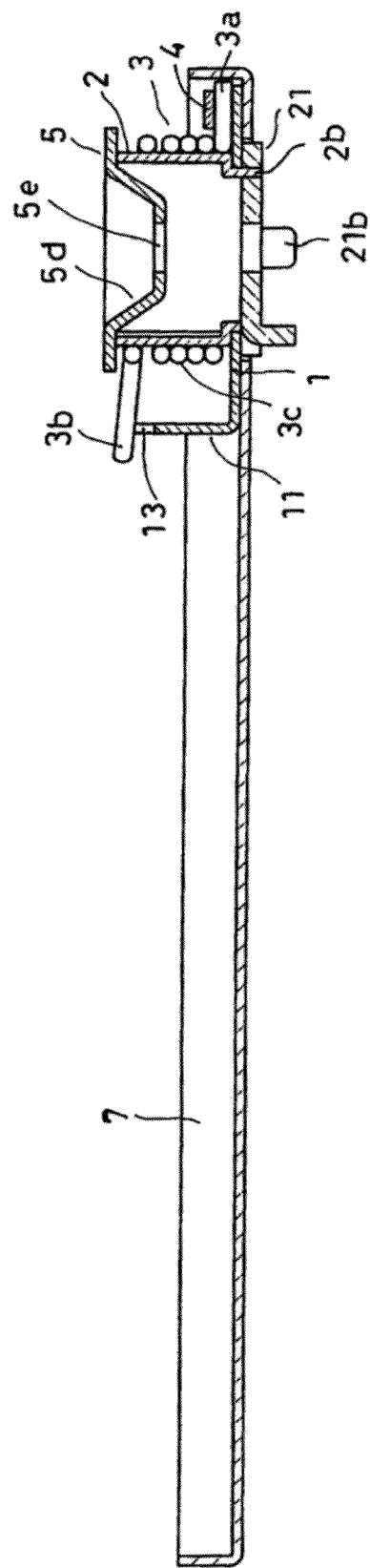
FIG. 3 is a cross-sectional view taken along the line B-B of FIG. 1.
Figure 6:
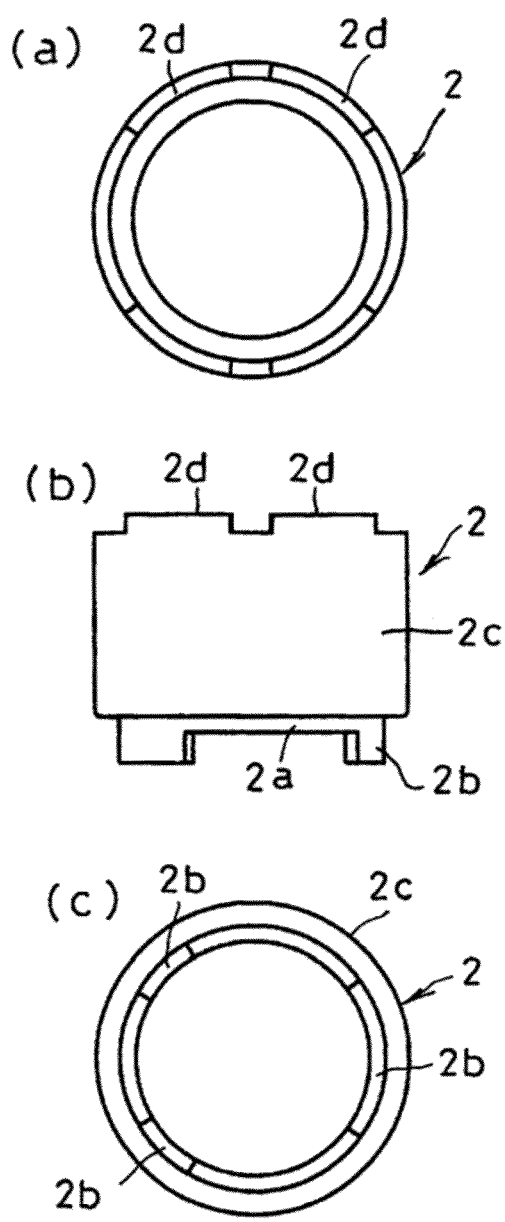
FIG. 6($a$) is a plane view of the stationary shaft, FIG. 6($b$) is a side view of the stationary shaft, and FIG. 6($c$) is a bottom view of the stationary shaft.

As shown in FIGS. 3 and 6, the stationary shaft 2 has a cylindrical shape and includes a large-diameter section 2$c$, around which the coil part 3$c$ of the lock spring 3 is wound and whose length is long enough to allow the coil part 3$c$ to tighten the large-diameter section 2$c$, a small-diameter section 2$a$, which is integrally formed on one end in the axial direction (the bottom) of the large-diameter section 2$c$, and stationary projections 2$d$, which are integrally formed on the other end of the large-diameter section 2c. Stationary projections 2b are formed at one end (the end on the opposite side to the large-diameter section 2c) of the small-diameter section 2a. The stationary projections 2d on the other end are connected with the cam member 5, and the stationary projections 2b formed on the small-diameter section 2a are connected with the ring element 21.

Figure 1:
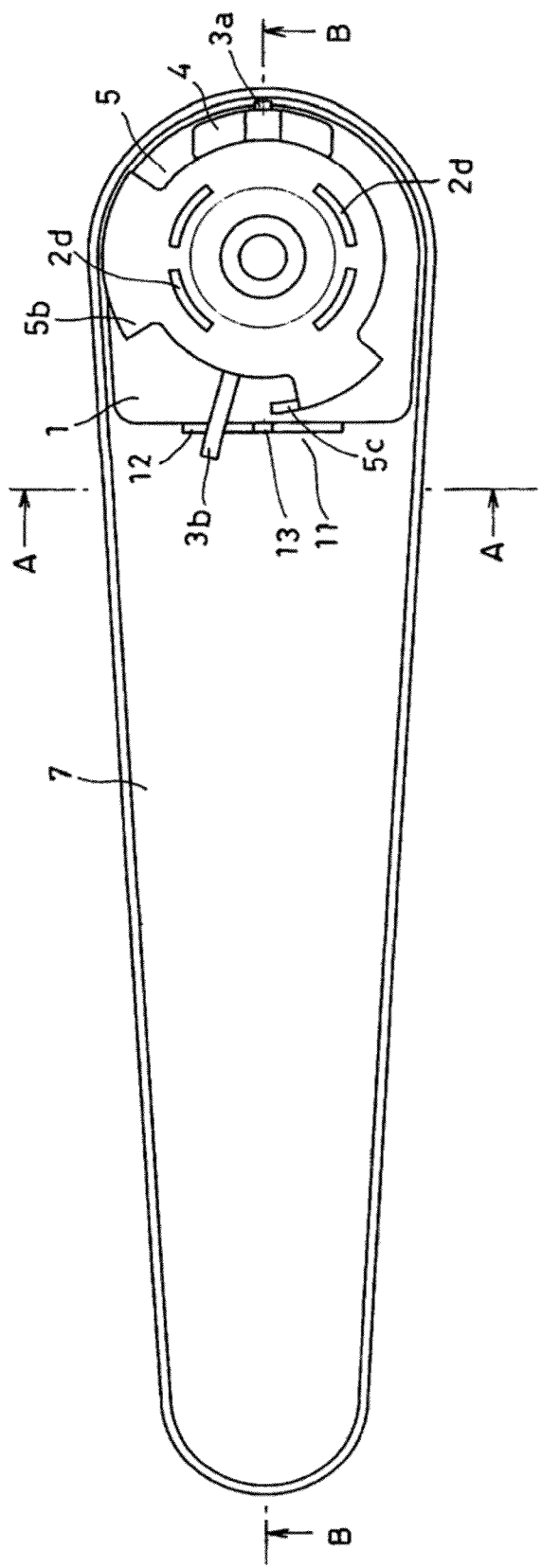
FIG. 1 is a front view of the armrest device in one embodiment of the present invention.
Figure 2:
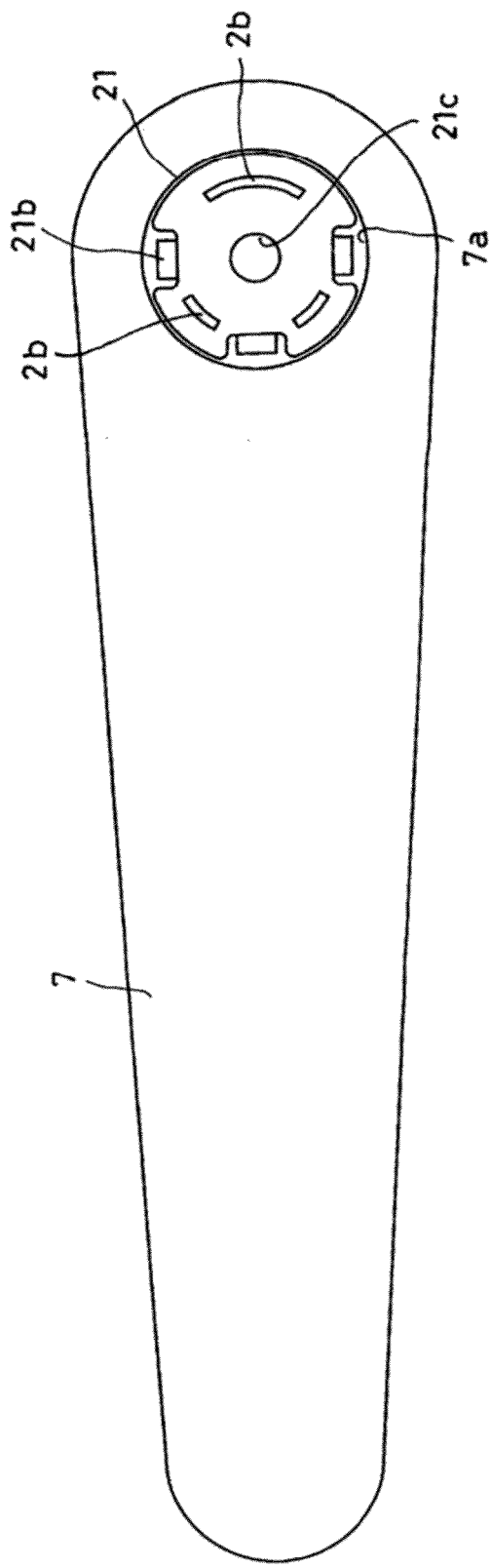
FIG. 2 is a back view of the armrest device.
Figure 7:
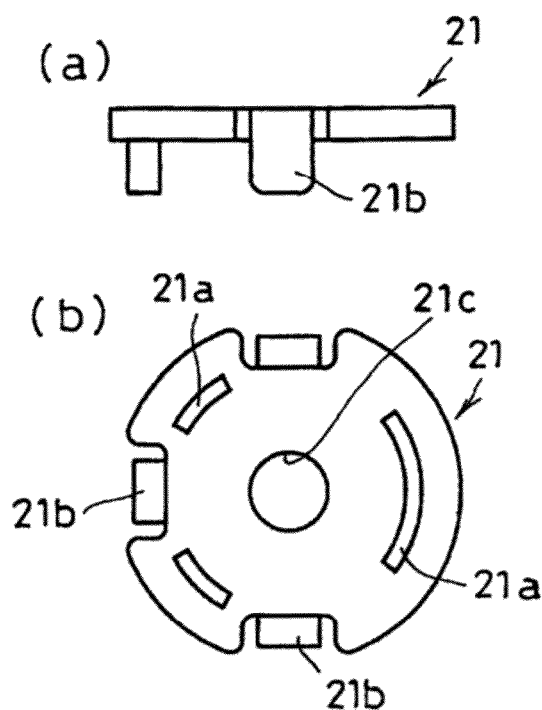
FIG. 7($a$) is a side view of the ring element, and FIG. 7($b$) is a bottom view of the ring element.

The ring element 21 is fixed to the armrest mounting part of a seat frame (seatback frame) of a vehicle seat (not shown). As shown in FIGS. 2, 3, and 7, pawls 21b—to be fitted and coupled with fitting holes formed on the armrest mounting part—are formed on the ring element 21. The ring element 21, the stationary shaft 2, and the cam member 5 become fixed to the armrest mounting part due to the pawls 21b being fitted with the fitting holes. A plurality of arc-like fixing holes 2a are formed on the same perimeter on the ring element 21. The stationary projections 2b at the end of the stationary shaft 2 are fixed to the fixing holes 2a by means of press-fitting, clamping, or welding, so that the stationary shaft 2 becomes integrated with the ring element 21. A screw hole 21c is formed at the center of the ring element 21. A screw (not shown) is inserted in the screw hole 21c to be screwed into the armrest mounting part, so that the ring element 21 is fixed to the armrest mounting part.

Figure 4:
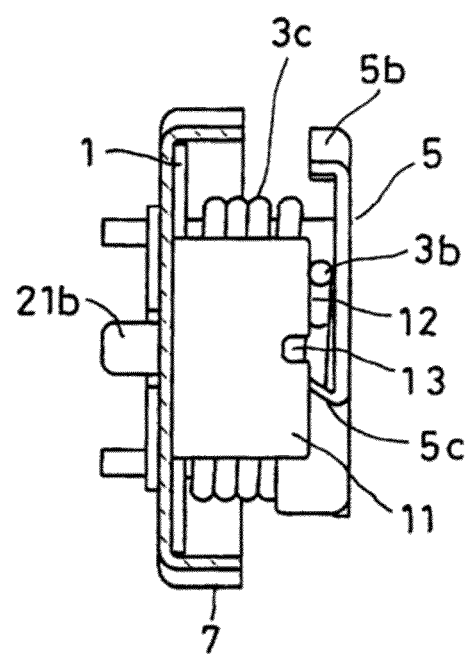
FIG. 4 is a cross-sectional view taken along the line A-A of FIG. 1.

As shown in FIGS. 3, 4, and 9, a coil spring having a coil part 3c is used as the lock spring 3. Under a free condition, the inside diameter of the coil part 3c is slightly smaller than that of the large-diameter section 2c of the stationary shaft 2. Thus, when the large-diameter section 2c of the stationary shaft 2 is inserted into the coil part 3c, the coil part 3c attaches closely to the large-diameter section 2c. A stationary-side hook 3a is formed on one end of the coil part 3c, and a free-side hook 3b is formed on the other end of the coil part 3c. The stationary-side hook 3a is locked with a hook-fixing member 4 that is welded to the rotary plate 1. For this purpose, the stationary-side hook 3a is inserted into an indentation at the backside of the projection 4a (see FIG. 11). Because the stationary-side hook 3a is locked with the hook-fixing member 4 on the side of the rotary plate 1, the entire lock spring 3 rotates together with the rotary plate 1. The free-side hook 3b is under a free condition, and—as will be described below—moves upward and downward in the axial direction of the stationary shaft 2, so as to reduce or enlarge the diameter of the coil part 3c.

Figure 8:
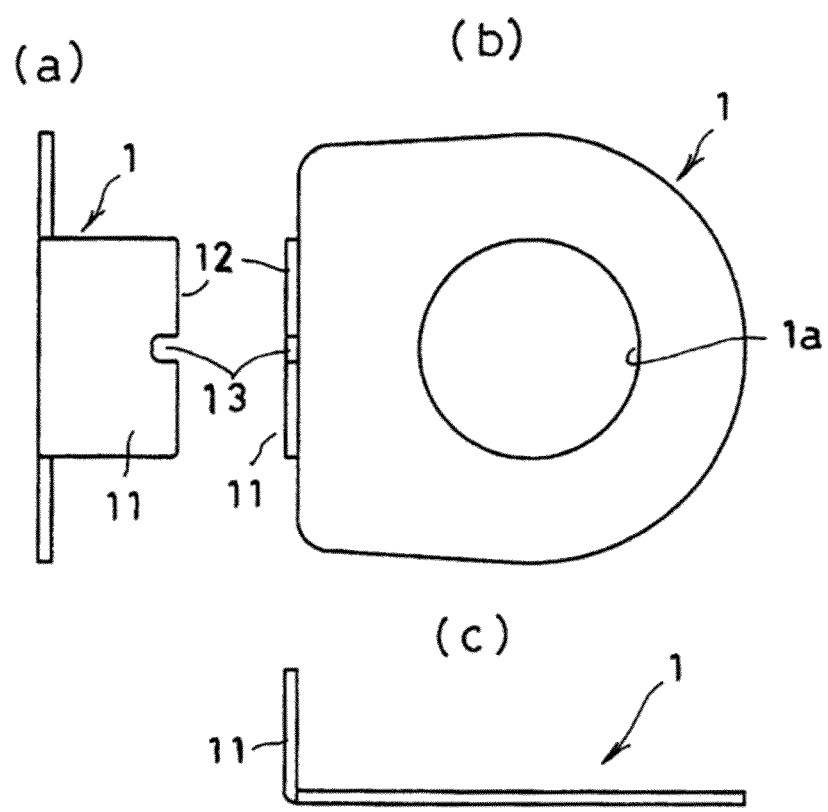
FIG. 8($a$) is a side view of the rotary plate, FIG. 8($b$) is a plane view thereof, and FIG. 8($c$) is a side view thereof.
Figure 11:
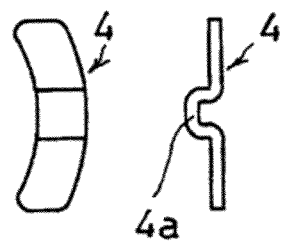
FIG. 11($a$) is a plane view of the hook-fixing member, and FIG. 11($b$) is a side view thereof.

As shown in FIG. 8, the rotary plate 1 has a through hole 1a. The small-diameter section 2a of the stationary shaft 2 is inserted into this through hole 1a. Thus, the rotary plate 1 can rotate against the stationary shaft 2. The rotary plate 1 is made to be integral with the armrest body 7 by welding or the like, and thus the armrest body 7 rotates together with the rotary plate 1.

A plate 11 for a hook that stands in the axial direction of the stationary shaft 2 is integrally formed on the rotary plate 1. As shown in FIG. 8, the plate 11 for the hook has a hook-supporting part 12 and a hook-fitting part 13. The hook-supporting part 12 is in contact with the free-side hook 3b of the lock spring 3. Due to this contact, the free-side hook 3b is maintained in a raised condition in the axial direction of the stationary shaft 2.

FIGS. 3 and 4 show the condition when the free-side hook 3b is supported by the hook-supporting part 12. Due to the hook-supporting part 12 supporting the free-side hook 3b, the portion of the hook-supporting part 12 that is in contact with the free-side hook 3b of the coil part 3c is raised from other portions, the coil part 3c is maintained in the diameter-reduced condition, and the lock spring 3 is locked. In addition, under the condition when the free-side hook 3b is supported by the hook-supporting part 12, the free-side hook 3b always presses down the top surface (i.e., the surface—on the side of cam member 5—of the stationary shaft 2) of the hook-supporting part 12, due to the reaction force of the coil part 3 attempting to return the coil part 3 to its original shape. Hereinafter in this embodiment, "up" refers to the cam member 5 side of the stationary shaft 2, and "down" refers to the side opposite to the cam member 5 side of the stationary shaft 2 (i.e., the armrest body 7 side). Incidentally, the stationary shaft 2 has enough length to allow the movement of the coil part 3c that accompanies the upward movement of the free-side hook 3b.

The hook-fitting part 13 of the plate 11 for the hook is indented like a groove, down from the hook-supporting part 12. The free-side hook 3b of the lock spring 3 drops into the hook-fitting part 13. By dropping of the free-side hook 3b, the diameter of the coil part 3c is enlarged, and the lock spring 3 is unlocked.

As shown in FIG. 10, a plurality of arc-like fixing holes 5a are formed on the same perimeter on the cam member 5, and the fixing projections 2d of the stationary shaft 2 are fixed to the fixing holes 5a by means of press fitting, clamping, welding, or the like. Thus, the cam member 5 is connected with the stationary shaft 2, and the cam member 5 is put into a fixed condition.

The unlocking cam part 5b and the relocking cam part 5c are separate from each other on the outer peripheral side of the cam member 5 along the rotation direction of the armrest body 7. The unlocking cam part 5b contacts the free-side hook 3b of the lock spring 3, which is supported by the hook-supporting part 12, and acts so as to make the free-side hook 3b become detached from the hook-supporting part 12 and drop into the hook-fitting part 13. Accordingly, the unlocking cam part 5b unlocks the lock spring 3. The surface of the unlocking cam part 5b, with which the unlocking cam part 5b contacts the free-side hook 3b, extends in the axial direction of the stationary shaft 2, and the height of the surface of the unlocking cam part 5b is approximately the same as that of the surface of the hook-supporting part 12 that supports the free-side hook 3b.

The relocking cam part 5c acts so as to raise the free-side hook 3b from the hook-fitting part 13, so that the free-side hook 3b becomes supported by the hook-supporting part 12. Accordingly, the relocking cam part 5c locks the lock spring 3. To raise the free-side hook 3b, the relocking cam part 5c has an inclined shape. That is, a tongue-like inclination, by which the free-side hook 3b is easily raised from the hook-fitting part 13, is formed on the surface of the relocking cam part 5c by which the relocking cam part 5c contacts the free-side hook 3b. To be more specific, the inclination—whose top is closer than its bottom to the free-side hook 3b—is formed on the surface by which the relocking cam part 5c contacts the free-side hook 3b.

Also, an indentation 5d, which is to be fitted inside the stationary shaft 2, is formed at the center of the cam member 5. In addition, a screw hole 5e is formed at the center of the indentation 5d, and a screw (not shown) is inserted into the screw hole 5e so that the entire stationary shaft 2 is fixed to the armrest mounting part.

Now, the actions of this embodiment will be explained with reference to FIGS. 12 to 20. In these drawings, the arrow S shows the direction for accommodating the armrest device toward the seatback, and the arrow T shows the direction for moving the armrest device out from the seatback. The symbol "O" means "rotatable," and the symbol "x" means "not rotatable." Also, in these drawings, (a) shows the movement of the free-side hook 3b against the plate 11 for the hook, and (b)

shows the movement of the free-side hook 3b which is caused by the rotation of the armrest body.

FIGS. 12 to 14 show the actions within the angle range in which the armrest device is used. In other words, these drawings show the locking actions of the armrest device. In these drawings, the rotation of the armrest body 7 in the arrow S direction is in the direction of enlarging the diameter of the lock spring 3, and therefore the armrest body 7 can be rotated by a small amount of force. In contrast, the rotation in the arrow T direction is done in the direction in which the diameter of the lock spring 3 is reduced, so as to fasten the stationary shaft 2. Therefore, the rotation of the armrest body 7 in the arrow T direction becomes locked, and the armrest body 7 is maintained at that angle. Thus, the angle of the armrest body 7 can be adjusted in a stepless manner. The hook-supporting part 12 allows the diameter of the lock spring 3 to be enlarged or reduced, and therefore the movement of the free-side hook 3b is not blocked in either the diameter-enlarging or diameter-reducing direction of the lock spring 3.

At the angle shown in FIG. 14, the unlocking cam part 5b of the cam member 5 contacts the free-side hook 3b. When the armrest body 7 is further rotated in the arrow S direction, the unlocking cam part 5b presses (rotates) the free-side hook 3b—which is on the hook-supporting part 12—in the diameter-enlarging direction of the lock spring 3. As shown by the arrow in FIG. 15, the free-side hook 3b drops into the hook-fitting part 13, and the free-side hook 3b is maintained in a fitted condition. That is, the free-side hook 3b of the lock spring 3 is supported by the hook-supporting part 12, and is raised in the axial direction of the stationary shaft 2. Due to the reaction force to the free-side hook 3b being raised, the free-side hook 3b drops, by itself, into the hook-fitting part 13, and is then maintained in that dropped condition. Under this condition, the diameter of the lock spring 3 is enlarged and the unlocked condition is maintained. In this condition, the armrest body 7 can be rotated in either the arrow S or arrow T direction. When the armrest body 7 is further rotated in the arrow S direction, the armrest body 7 comes to an accommodation position as shown in FIG. 16.

When the armrest body 7 is rotated in the armrest-use direction, shown by the arrow T, from the accommodating position of FIG. 16, the armrest body 7 is sequentially put into conditions shown in FIGS. 17, 18, 19, and 20. As shown in these drawings, because the free-side hook 3b is fitted with the hook-fitting part 13 and the diameter of the lock spring 3 is enlarged to the unlocked condition, the armrest body 7 can be rotated in either the arrow S or arrow T direction.

FIG. 20 shows the lowermost position of the armrest body 7. When the armrest body 7 is rotated in the arrow T direction so as to move to this position, the relocking cam part 5c of the cam member 5 raises the free-side hook 3b from the hook-fitting part 13. Accordingly, the free-side hook 3b becomes detached from the hook-fitting part 13, and is then supported by the hook-supporting part 12. Thereby, the armrest body 7 is locked as shown in FIG. 12. When in this locked condition, the armrest device's angle can be adjusted in a stepless manner, as mentioned earlier.

In this embodiment, the free-side hook 3b is raised in the axial direction of the stationary shaft 2 and supported by the hook-supporting part 12, and therefore, the lock spring 3 is locked. This direction for raising the free-side hook 3b is the direction in which the free-side hook 3b goes away from the coil part 3c, and therefore, the coil part 3c does not hinder the movement of the free-side hook 3b. Accordingly, the free-side hook 3b can easily move, excessive force does not act on the coil part 3c, and the coil part 3c does not become displaced. For this reason, a stable locking force can be obtained, and the hook-supporting part 12 and the free-side hook 3b, which slide on each other, do not become abraded or enmeshed with each other.

FIGS. 21 to 24 show another embodiment of the present invention. In this embodiment, in addition to the structure shown in FIGS. 1 to 20, a spacer 15 is incorporated. As shown in FIGS. 21 to 23, the spacer 15 is provided between the bottom surface of the cam member 5 and the top surface of the free-side hook 3b of the coil part 3c of the lock spring 3.

As shown in FIG. 24, the spacer 15 has a disc-ring shape. The spacer 15 has a presser-face 15a, and a hook-allowance-face 15b. The presser-face 15a is formed by thickening approximately one-half of the ring shape. The presser-face 15a is thick and faces the coil part 3c of the lock spring 3. Thus, as shown in FIG. 22, the presser-face 15a contacts the coil part 3c of the lock spring 3, and prevents displacement of the coil part 3c in the axial direction.

The hook-allowance-face 15b is formed by thinning approximately one-half of the ring shape. The hook allowance face 15b is thin and faces the free-side hook 3b of the lock spring 3. Accordingly, the hook-allowance-face 15b does not interfere with the free-side hook 3b, and the free-side hook 3 can smoothly perform the above-mentioned raising and dropping actions. The symbol 15c denotes a relief groove that is formed in the hook-allowance-face part 15b. The free-side hook 3b moves up and down in the relief groove 15c, as a result of which the raising and dropping actions of the free-side hook 3b are smooth.

In this embodiment, in which the spacer 15 is incorporated, the hook-allowance-face part 15b is thin, and does not hinder the upward and downward movement of the free-side hook 3b along the stationary shaft 2. Therefore, the free-side hook 3b can move smoothly. Also, the presser-face 15a presses the coil part 3c of the lock spring 3. Thus, even when the free-side hook 3b rises along the stationary shaft 2, the coil part 3c does not follow the rising free-side hook 3b to become displaced in the axial direction. Therefore, the entire coil part 3c does not become raised. Accordingly, the coil part 3c can be prevented from becoming deformed and wound around the stationary shaft 2, and a stable locking force is secured.

FIGS. 25 and 26 show an embodiment in which the armrest body 7 is deformed. In the embodiment shown in FIG. 25, the plate 11 for the hook having the hook-supporting part 12 and the hook-fitting part 13 have an L-shape and are directly welded to the armrest body 7. Accordingly, in this embodiment, the plate 11 for the hook is independent from the rotary plate 1, and thus there is no need for a rotary plate 1. This results in the advantage that the weight of the entire armrest device can be reduced.

In the embodiment shown in FIG. 26, the armrest body 7 is press-punched so that the plate 11 for the hook is integrally formed, projecting from the armrest body 7. In this case, the number of parts can be reduced, and the weight of the entire armrest device can be reduced further, resulting in another advantage of a reduced cost.

FIG. 27 shows an embodiment in which the lock spring 3 is deformed. In the lock spring 3, the coil part's inside diameter of the portion adjacent to the free-side hook 3b of the coil part 3c is larger—by approximately one turn of the coil part 3c—than the coil part's inside diameter of other portions. Symbol 3f denotes the portion of the coil part having an enlarged inside diameter. In this manner, there is a space between the coil portion that has an enlarged inside diameter and the stationary shaft 2, and therefore the free-side hook 3b moves upward more smoothly in the axial direction of the stationary shaft 2. Thereby, abrasion between the free-side hook 3b and the hook-supporting part 12 is reduced.

FIG. 28 shows an embodiment in which the plate 11 for the hook is deformed. The plate 11 for the hook is integrally formed with the rotary plate 1 so as to project from the rotary plate 1. The plate 11 for the hook includes a hook-guiding part 17 that is formed by making an inlet portion of the hook-fitting part 13—that is, on the side separate from the hook-supporting part 12—higher than the hook-supporting part 12. Also, the hook-guiding part 17 is inclined against the hook-supporting part 12. That is, the hook-guiding part 17 is inclined so that the surface of the hook-fitting part 13 opposite to the side onto which the free hook 3b drops is higher—by about the width of the diameter of the wire of the lock spring 3—than the surface of the hook-supporting part 12, and so that the free-side hook 3b drops toward the hook-fitting part 13. To be more specific, the hook-guiding part 17 is inclined such that the top of the hook-guiding part 17 is closer to the free-side hook 3b than is its bottom. Such a hook-guiding part 17 facilitates dropping of the free-side hook 3b on the hook-supporting part 12 into the hook-fitting part 13.

When the free-side hook 3b is pressed by the unlocking cam part 5b and drops into the hook-fitting part 13, friction force—due to the reaction force of the coil part 3c whose diameter is enlarged—is generated between the free-side hook 3b and the unlocking cam part 5b. When the free-side hook 3b is to drop into the hook-fitting part 13 due to the reaction force against the free-side hook being raised along the axial direction of the stationary shaft 2, this friction force becomes resistance against the dropping. The hook-guiding part 17 forcibly guides the free-side hook 3b into the hook-fitting part 13 against this resistance and ensures that the free-side hook 3b drops into the hook-fitting part 13.

FIGS. 29 and 30 show an embodiment in which the cam member 5 is deformed. In the cam member 5 of FIG. 29, an inclined guiding face 18 is formed on the surface—which contacts the free-side hook 3b—of the unlocking cam part 5b. The inclined guiding face 18 is inclined to press the free-side hook 3b toward the hook-supporting part 12. To be more specific, the inclined guiding face 18 is inclined such that its top is closer to the free-side hook 3b than is its bottom. Such an inclined guiding face 18 guides the free-side hook 3b to the hook-fitting part 13. That is, the inclined guiding face 18 increases the force of the free-side hook 3b pressing down the top surface of the hook-supporting part 12, and therefore the free-side hook 3b more easily drops into the hook-fitting part 13.

In the cam member 5 of FIG. 30, an inclined holding face 19 is formed on the unlocking cam part 5b. The inclined holding face 19 is formed by inclining the bottom surface—which contacts the free-side hook 3b—of the unlocking cam part 5. The inclined holding face 19 is inclined so as to further press down the free-side hook 3b that has dropped into the hook-fitting part 13. The inclined holding face 19 is inclined such that its top is farther from the free-side hook 3b than is its bottom. Accordingly, after the free-side hook 3b has dropped into the hook-fitting part 13, the inclined holding face 19 contacts the free-side hook 3b so as to make the free-side hook 3b drop more deeply into the hook-fitting part 13. Formation of such an inclined holding face 19 allows further pressing down of the free-side hook 3b, which has dropped into the hook-fitting part 13. Therefore, the condition that the free-side hook 3b is fitted with the hook-fitting part 13 is obtained more surely. Accordingly, unlike Patent Document 2, there is no need for pressing the free-side hook with the unlocking contact part after the lock is canceled.

What is claimed is:

1. An armrest device, comprising:
   a stationary shaft, which is fixed to a seat frame;
   an armrest body into which the stationary shaft is inserted, and which is rotatably supported by the stationary shaft,
   a lock spring made of a coil spring having a coil part that is tightly wound around the stationary shaft, with one end of the coil spring serving as a stationary-side hook that is locked to the armrest body and whose other end serves as a free-side hook;
   a plate projecting from the armrest body, and having a hook-supporting part that supports the free-side hook in a condition so that the free-side hook is raised in a direction away from the coil part in an axial direction of the stationary shaft, and a hook-fitting part that maintains a diameter-enlarged condition of the coil part due to dropping down of the free-side hook in a direction approaching the coil part in the axial direction of the stationary shaft by a reaction force to the free-side hook raised on the hook-supporting part;
   a cam member provided on the stationary shaft and having an unlocking cam part for dropping down the free-side hook into the hook-fitting part from the hook-supporting part when the armrest body is rotated in an accommodating direction, and a relocking cam part for raising the free-side hook from the hook-fitting part and causing the hook-supporting part to support the free-side hook when the armrest body is rotated in the armrest-use direction.

2. The armrest device set forth in claim 1, further including a spacer that has a presser-face part that faces the coil part of the lock spring and that restrains the axial displacement of the coil part, and a hook-allowance-face part that faces the free-side hook and that allows the free-side hook to be raised or dropped, and with said spacer mounted to the stationary shaft.

3. The armrest device as set forth in claim 1, wherein the plate has a hook-guiding part that contacts the free-side hook, which is supported by the hook-supporting part, so as to promote dropping of the free-side hook into the hook-fitting part.

4. The armrest device as set forth in claim 1, wherein the cam member has an inclined guiding face that guides the free-side hook, which is supported by the hook-supporting part, to the hook-fitting part.

5. The armrest device as set forth in claim 1, wherein the cam member has an inclined holding face that contacts the free-side hook, so as to make the free-side hook drop more deeply into the hook-fitting part when the free-side hook drops into the hook-fitting part.

6. The armrest device as set forth in claim 1, wherein an inside diameter of a portion of the coil part adjacent to the free-side hook, is a larger than an inside diameter of any other portion of the coil part.

* * * * *